United States Patent
Geipel

[11] 3,717,323
[45] Feb. 20, 1973

[54] BALL VALVES
[75] Inventor: Ernest W. Geipel, Chicago, Ill.
[73] Assignee: Crane Co., New York, N.Y.
[22] Filed: Sept. 24, 1971
[21] Appl. No.: 183,395

[52] U.S. Cl.................................251/315, 251/317
[51] Int. Cl................................................F16k 5/06
[58] Field of Search..............251/170, 315, 316, 317

[56] References Cited

UNITED STATES PATENTS

| | | | |
|---|---|---|---|
| 2,890,017 | 6/1959 | Shafer | 251/317 X |
| 3,387,815 | 6/1968 | Richards | 251/174 |
| 3,401,914 | 9/1968 | Shand | 251/174 X |
| 3,669,406 | 6/1972 | Moore | 251/317 |

FOREIGN PATENTS OR APPLICATIONS

| 44,522 | 11/1938 | Netherlands | 251/317 |

Primary Examiner—Harold W. Weakley
Attorney—George S. Schwind

[57] ABSTRACT

A ball valve having a novel seat arrangement whereby the seat rings, placed on opposite sides of the ball closure member, are each retained by a ferrule which is screwed into the valve body. The ferrule secures and positions the seat ring in a manner whereby the seat is advanced toward the ball to simultaneously form a seal between a counterbore in the valve body and the outer periphery of the seat, and, to preload the seat against the surface of the ball closure member, forming a seal therebetween. Such simultaneous forming of seals is assisted by a tapered conical surface of contact between seat rings and their respective ferrule. Thus, the advancement of the ferrule toward the seat results in a seal being established simultaneously between the seat and the body, and, the ball closure member and seat.

3 Claims, 2 Drawing Figures

BALL VALVES

This invention relates to ball valves and in particular to an improved seat construction which forms an effective seal between the ball closure member and the annular seats which are normally associated with such members.

Ball valves normally utilize annular seats positioned on opposite sides of the ball closure member which are in contact with the ball so as to form an effective seal thereby preventing flow across the ball when the ball is in a closed position. The ball closure member has a passage therethrough which is brought into alignment with the inlet and outlet portions of the valve to allow passage of fluid therethrough by rotating the ball 90°, in the usual, well known manner.

Seat construction is an all important aspect in the design of ball valves. Proper design and construction is an imperative to eliminate blowout of the seat during operation, reduce tearing of the seat when the ball closure member is rotated, insure even wear of the seats, and, enable the ball member to be easily operated through its entire range of rotation.

Two prime problems encountered in ball valve design are seat blowout and proper seat preloading. The latter term is associated with the static pressure, in the form of compression, applied to the ball by the seat to effect a sufficient seal yet permit the ball closure member to be rotated with reasonable force.

The instant invention relates to a ball valve having a novel seat construction which is directed to solve the aforementioned problems. Specifically, the invention herein described utilizes an annular seat positioned on each side of the ball closure member wherein the outer periphery of the seat is securely retained against a shoulder, formed by a counterbore in the valve body, and by a ferrule which is screwed into the body. As the ferrule is axially screwed into the body, it compresses the outer peripheral portion of the seat against the shoulder to form a seal between the valve body and seat. In addition, the seat is moved into contact with the ball to preload it. Such simultaneous sealing is effected by the novel cooperation between each seat and its respective ferrule. A portion of the surface between the seat and ferrule includes a truncated conical contact surface of the ferrule which converges toward the ball closure member. This surface permits the components of force transmitted through the seat by the ferrule to be directed angularly toward the shoulder formed in the counterbore to form a seal between the valve body and sear, and axially toward the ball to thus preload the seat.

The principal object of the invention is to provide an improved seat construction for a ball valve wherein the seat is simultaneously preloaded against the ball closure member and is sealed against the valve body.

Another object is to provide an improved ball valve wherein the novel seat and ferrule arrangement permits the valve to be readily assembled and eliminates the additional time heretofore required for adjusting the preloading of the seat.

Other objects and advantages will become apparent from the following description of the exemplary embodiment wherein.

Figure 1:
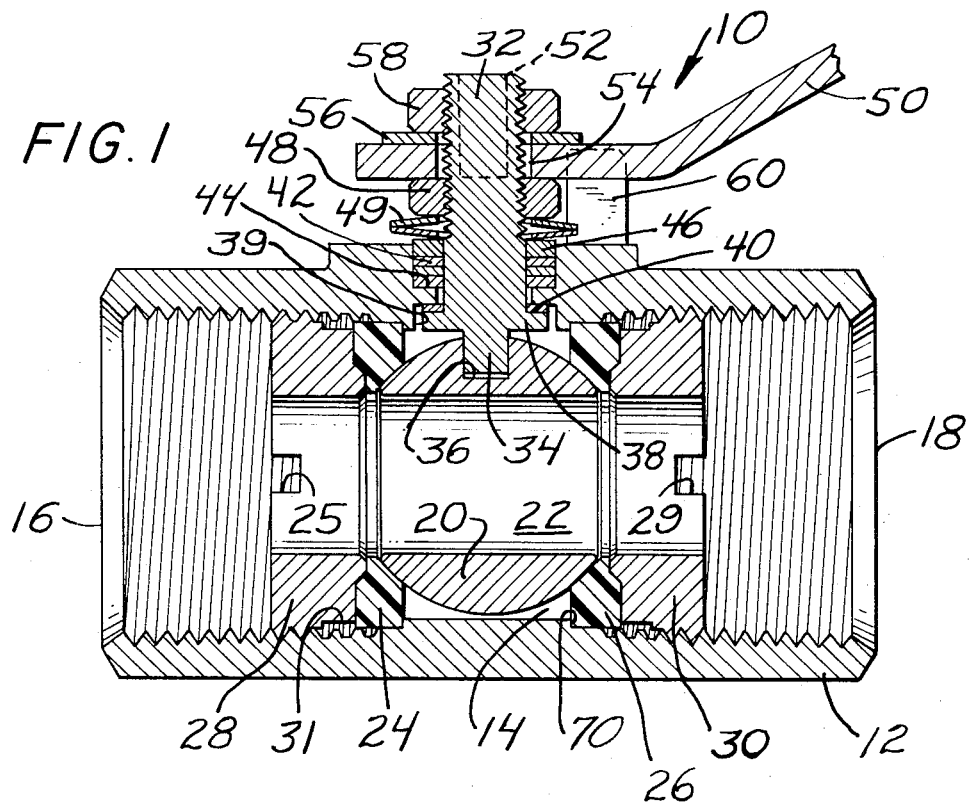
FIG. 1 is a longitudinal section view of the ball valve.

Referring to the drawings, and in particular FIG. 1, ball valve 10 includes a generally cylindrical body 12 having an internal chamber 14 which is in communication with two flow passages 16, 18. Although the body is of generally cylindrical configuration, it may be of modified octagonal cross section, or the like. Passages 16, 18 represent the usual inlet and outlet passages of the valve body which may be reversed, if so desired, depending upon which side fluid is admitted into the body 12.

To control the flow of fluid through the valve, a rotary flow control ball or closure member 20 having axial port 22 therethrough is in alignment with passages 16, 18. Annular valve seats 24, 26 sealably engage opposite sides of the ball 20 in encircling relationship to the port 22. Seats 24, 26 are formed of any of the yieldable, resilient, materials commonly used for such purposes, Polytetrafluorethylene or elastic rubber compositions being frequently used.

Rotating closure member 20 by 90° places the port 22 transverse to the seats 24, 26 to thereby prevent flow through the valve.

Rotation of the ball closure member 20 is effected by stem 32 having a rectangular, cross-sectional end portion 34 which is inserted into a generally rectangular recess 36 milled into the top of the said closure member, forming a driving connection between the ball and stem. Stem collar 38, formed integral with and immediately above the end portion 34 of stem 32, prevents inadvertent removal of the stem 32 from the top of the valve body and also prevents blowout of the stem in the event that external valve parts such as nuts and packing are removed. Collar 38 is positioned in an internal well 39 and thrust washer 40 is inserted between collar 38 and body 12 on stem 32 as shown. Packing 42, constructed of yielding sealing material, is disposed in encircling relation to stem 32 in external body well 44 and is retained in the said well by gland 46, the latter being urged by springs 49. Springs 49 are compressed by packing nut 48 which is threadedly positioned on stem 32. Tightening of packing nut 48 on stem 32 draws the collar 38 and thrust washer 40 into contact with the body 12 to thereby tighten the packing 42 in a well known manner. Springs 49 are two convex shaped disc springs which are placed in reverse position to each other to provide maximum deflection before the springs become flat. Stem 32 has flat portions 52 on opposite sides thereof adapted to receive a complementary orifice 54 in handle 50 to form a driving connection between said handle and stem. The handle 50 is secured to stem 32 by means of stem nut 58, with an identification plate 56 inserted between the said handle and nuts.

Seats 24, 26 are retained within the body by ferrules 28, 30, which are threadedly engaged into internally threaded passages 16, 18, respectively. Slots 25, 29 in ferrules 28, 30, respectively, enable a driver or similar tool to be inserted in the slots to rotate the ferrules. Although threaded passages 16, 18 threadedly receive ferrules 28, 30, they also receive pipe when the valve is placed in line. Additionally, it is understood that flanged connections may be used in place of threaded, if so desired, without deviating from the scope or intent of the invention.

Figure 2:
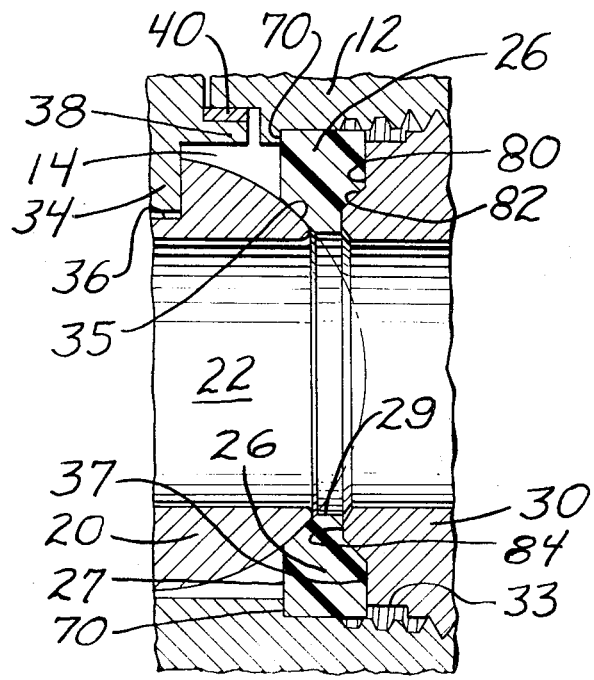
FIG. 2 is a fragmentary sectional view, on an enlarged scale, similar to FIG. 1, showing the novel seat arrangement.

With reference to FIG. 2, the novel features of the invention can more readily be seen in this enlarged view. Seat 26, which is similar in construction to seat 28, is axially positioned in the body so that it abuts shoulder 70. The shoulder 70 is formed by counterboring the valve chamber an amount sufficient to prevent axial displacement of the seat when secured against the said shoulder, and, to preclude the possibility of seat blowout from the body when subjected to operating pressure during use. Such blowout usually occurs where full differential pressure exists on the upstream side across the valve seat. The internal threads on passages 16, 18 are terminated sufficiently short of shoulders 70 to provide smooth walls surrounding the seats 24, 26. Ferrules 28, 30 are undercut, as at 31, 33, respectively, to assure free engagement of the ferrule as it is rotatably inserted into its passage. Ferrule 30, shown as exemplary, has a first flat surface 80 along a segment on its outer radius, the said surface being perpendicular to the axis of the valve body 12. A conical surface 82 projects outward from and converges toward the axis of the valve. Such conical surface 82 terminates at a second flat surface 84, parallel to surface 80 whereby a truncated cone is formed projecting toward the axis of the valve having a convergance angle of approximately 45° from the ferrule. The valve seat 26 has a front face 27 which is abutted against shoulder 70. The internal diameter 29 of the seat is somewhat larger than the diameter of port 22 of closure member 20 to allow for any slight extrusion of the seat when the same is preloaded. Seat 26 has a chamfered portion 35, which is generally the contour of the ball, to permit a sufficient contact area between the ball and seat to insure proper sealing. The back portion of the seat, i.e., that adjacent the ferrule and generally indicated by reference numeral 37, has a surface which is complementary to the truncated side of the ferrule, heretofore described. The seats 24, 26, ball closure member 20, and ferrules 28, 30 are generally held to close tolerance in order to assure proper seating over varying pressure and temperature operating requirements.

The location of shoulder 70 is such that seat 26 does not contact the closure member 20 until the seat is properly loaded. Ferrule 30 is threadedly advanced into the body 12 via passage 18, to tightly secure the seat 26 against the shoulder 70. The ferrule is constructed in such a manner that its surface adjacent the valve seat, which includes the truncated conical portions 82 and parallel faces 80, 84 initially preload the seat since the first surface contacted by front face 27 is the shoulder 70. As the ferrule is farther advanced, the pressure on ring 26 will cause the same to partial cold flow or extrude in the shoulder area 70. Additionally, the truncated cone surface 82 will exert a component of force to maintain the seal between the shoulder 70 and seat 26. Additionally, the flat surface 84 will urge the inner peripheral portion of the seat 26 to be preloaded against the ball. Such preloading and sealing at the shoulder surface is effected by the unique cooperation between the ferrule and the seat. The seat, upon being compressed to the point of being extruded, will subsequently be advanced by another portion of the ferrule, surface 84, to thus preload the seat at a proper compression to insure a seal between the said ball closure member 20 and seat 26. Thus, as the ferrule 30 is advanced toward the closure member 20, the truncated tapered portion compresses the seat whereby components of force urge the seat into sealing engagement with the ball, and, urge the seat into sealing engagement with the shoulder portion of the valve body to simultaneously effect sealing in both areas.

I claim:

1. A ball valve comprising:
   a. a generally cylindrical valve housing having an inlet and outlet, said housing having a central portion of reduced diameter forming spaced apart circumferential shoulders;
   b. a ball closure member having a passage therethrough adapted to be rotated into and out of communication with said inlet and outlet;
   c. an annular flexible valve seat including a front face positioned against each said circumferential shoulder to locate said seat in reference to said ball, and, a back portion having an inverted, conical truncated recess; and,
   d. a ferrule adapted to be axially positioned against each of said valve seats, said ferrule having a conical, truncated portion adapted to be received by said recess to thereby simultaneously seal said seat against said valve body in the proximity of said shoulder and position said seat against said ball to preload said seat when said ferrule is advanced to position said seat against said shoulder.

2. A ball valve as claimed in claim 1 wherein said conical truncated portion and conical truncated recess converge substantially toward the center of said closure member.

3. A ball valve as claimed in claim 2 where said conical truncated portion and conical truncated recess converge substantially toward the center of said closure member at an angle of approximately 45°.

* * * * *